United States Patent
Casas Noriega et al.

(10) Patent No.: US 9,145,210 B2
(45) Date of Patent: Sep. 29, 2015

(54) REDUNDANT AIRCRAFT COOLING SYSTEM FOR REDUNDANT AIRCRAFT COMPONENTS

(75) Inventors: Wilson Willy Casas Noriega, Hamburg (DE); Wolfgang Ebigt, Hamburg (DE); Andreas Frey, Immenstaad (DE)

(73) Assignee: Airbus Deutschland GmbH, Hamburg (DE)

( * ) Notice: Subject to any disclaimer, the term of this patent is extended or adjusted under 35 U.S.C. 154(b) by 1523 days.

(21) Appl. No.: 12/518,374

(22) PCT Filed: Dec. 3, 2007

(86) PCT No.: PCT/EP2007/010473
§ 371 (c)(1),
(2), (4) Date: Jan. 7, 2010

(87) PCT Pub. No.: WO2008/071319
PCT Pub. Date: Jun. 19, 2008

(65) Prior Publication Data
US 2010/0132920 A1 Jun. 3, 2010

Related U.S. Application Data

(60) Provisional application No. 60/870,148, filed on Dec. 15, 2006.

(30) Foreign Application Priority Data

Dec. 15, 2006 (DE) .................. 10 2006 059 418

(51) Int. Cl.
*F28D 15/00* (2006.01)
*F28F 7/00* (2006.01)
(Continued)

(52) U.S. Cl.
CPC ............... *B64D 13/00* (2013.01); *B64D 13/06* (2013.01); *B64D 2013/0614* (2013.01); *B64D 2013/0674* (2013.01); *F25B 25/005* (2013.01); *F25B 2500/06* (2013.01); *Y02T 50/56* (2013.01)

(58) Field of Classification Search
CPC .................. B64D 13/00; B64D 13/05; B64D 2313/0614; B64D 2013/0674; Y02T 50/56; F25B 25/005; F25B 2500/06
USPC .......... 62/259.2, 239, 238.1–238.2, 434, 333; 165/104.11, 185
See application file for complete search history.

(56) References Cited

U.S. PATENT DOCUMENTS 5,253,484 A 10/1993 Corman et al.
5,513,500 A * 5/1996 Fischer et al. .................. 62/239
(Continued)

FOREIGN PATENT DOCUMENTS

DE 10361645 A1 8/2005
EP 0666214 8/1995
(Continued)

OTHER PUBLICATIONS

R. B. Sherbourne, "Fourth Air Conditioning Group," Aircraft Engineering, pp. 22-24, 26, Apr. 1973.
(Continued)

*Primary Examiner* — Mohammad M Ali
(74) *Attorney, Agent, or Firm* — Wood, Herron & Evans, LLP

(57) ABSTRACT

An aircraft cooling system includes a first coolant stream which cools at least one first heat load and a second coolant stream which cools at least one second heat load. The aircraft cooling system is formed such that the first heat load and the second heat load are thermally coupled together. The first heat load and the second heat load can be formed by two mutually redundant aircraft components. A third coolant stream thermally couples the first heat load and the second heat load together. The third coolant stream can be cooled by a heat sink, such as the outer skin of the aircraft in a bilge region.

12 Claims, 1 Drawing Sheet

(51) Int. Cl.
  *B64D 13/00* (2006.01)
  *B64D 13/06* (2006.01)
  *F25B 25/00* (2006.01)

(56) References Cited

U.S. PATENT DOCUMENTS

| | | | |
|---|---|---|---|
| 7,466,553 B2 * | 12/2008 | Hamman | 361/718 |
| 7,980,928 B2 * | 7/2011 | Markwart et al. | 454/76 |
| 2005/0051668 A1 * | 3/2005 | Atkey et al. | 244/118.5 |
| 2007/0119205 A1 * | 5/2007 | Zywiak et al. | 62/401 |
| 2007/0137234 A1 * | 6/2007 | Zywiak et al. | 62/239 |

FOREIGN PATENT DOCUMENTS

| | | |
|---|---|---|
| EP | 2002127994 | 5/2002 |
| EP | 2005063568 | 7/2005 |
| EP | 2008025462 | 3/2008 |
| JP | 2001010595 | 1/2001 |
| JP | 2004150664 | 5/2004 |
| RU | 2127212 | 3/1999 |
| WO | 2005030579 | 4/2005 |

OTHER PUBLICATIONS

International Search Report Forms: PCT/ISA/220, PCT/ISA/210, PCT/ISA/237, mailing date of Apr. 9, 2008.

Japanese Patent Office, Office Action Summary in related Japanese patent application, dated Jun. 26, 2012 English language translation ((2 pgs.), Japanese language (2 pgs.).

Russian Agency for Patents and Trademarks, English language translation of Decision on Granting in related Russian Patent Application No. 2009124420/11, dated Feb. 8, 2012 (4 pgs.).

Russian Agency for Patents and Trademarks, Decision on Granting in related Russian Patent Application No. 2009124420/11, dated Feb. 8, 2012 (7 pgs.).

Chinese Patent Office, First Office Action in related Chinese Patent Application No. 200780046175.4, dated Dec. 7, 2011.

* cited by examiner

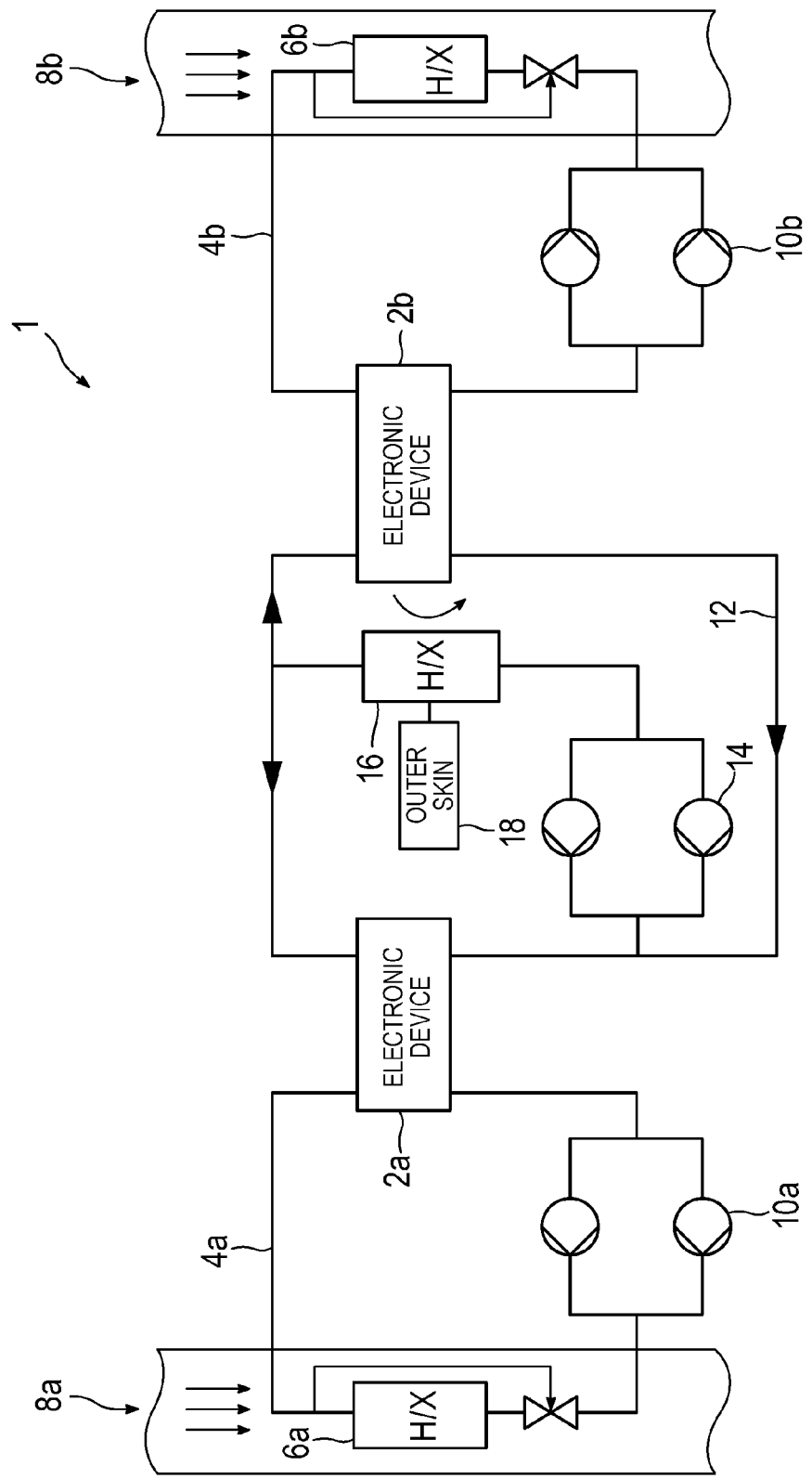

REDUNDANT AIRCRAFT COOLING SYSTEM FOR REDUNDANT AIRCRAFT COMPONENTS

This application claims the benefit of International Application No. PCT/EP2007/010473, filed on Dec. 3, 2007, and German Application No. DE 10 2006 059 418.5, filed on Dec. 15, 2006, and U.S. Application No. 60/870,148, filed on Dec. 15, 2006.

TECHNICAL FIELD

The present invention relates to a redundant aircraft cooling system for redundant aircraft components.

BACKGROUND

Safety-relevant components of an aircraft, for example electronic devices, are provided in a redundant design, i.e. they are provided in duplicate, for example, in the aircraft. As electronic devices dissipate power, they must be cooled. For this purpose the electronic devices are typically disposed on a cooling plate and accommodated in so-called electronics cabinets. A coolant flows through the cooling plates, which is being circulated by means of one or a plurality of pump(s) and cooled in a heat exchanger or another heat sink. As the electronic components are provided redundantly, redundant cooling is also required in order to ensure that the flight continues safely if one cooling device fails. A separate cooling device is therefore associated with each of the redundant electronic devices. If a cooling device fails, for example due to a leakage, the electronic device which is cooled by means of the latter can no longer be operated. This has a limiting effect on the operation of the aircraft, as although the flight can continue on account of the electronic device used in a redundant design, a new take off must no longer take place for reasons of safety. The availability of the aircraft is as a result reduced.

An object of the invention is to provide a redundant aircraft cooling system for redundant aircraft components.

SUMMARY OF THE INVENTION

This object is achieved by an aircraft cooling system with a first coolant stream which cools at least one first heat load, and with a second coolant stream which cools at least one second heat load, wherein the aircraft cooling system is formed such that the first heat load and the second heat load are thermally coupled together. The first heat load and the second heat load can be generated by two mutually redundant aircraft components. The first coolant stream and the second coolant stream are generated by separate air conditioning devices. Two redundant coolant streams are therefore available. If one of the coolant streams fails, both heat loads are still cooled by the coolant stream which has not failed, as the two heat loads are thermally coupled together. This enables the aircraft to be operated more reliably. The thermal coupling between the first heat load and the second heat load can be achieved by a mechanical coupling. The first coolant stream and the second coolant stream can in each case be a circuit in which the coolant is always in the liquid state.

The aircraft cooling system can be formed such that the first coolant stream and the second coolant stream cool the first heat load and the second heat load in succession. In this particularly simple embodiment the first heat load and the second heat load are disposed in a series connection and the first coolant stream and the second coolant stream cool the first and the second heat load in succession. If one of the two coolant streams fails, in this embodiment both the first heat load and the second heat load are cooled, which enables the aircraft to be operated more safely.

The aircraft cooling system can comprise a third coolant stream which thermally couples the first heat load and the second heat load together. Particularly effective thermal coupling of the first heat load to the second heat load is as a result achieved. The third coolant stream can be formed as a coolant circuit. The third coolant stream can always be in the liquid state. A coolant pump can be located in the coolant is circuit. However the flow of the third coolant stream can also be produced through passive measures.

The third coolant stream can be cooled by a heat sink. The heat sink can be formed as a heat exchanger. The third coolant stream can also be cooled by a refrigerating machine. In doing so, the third coolant stream can pass through a compressor, a condenser and an evaporator in the coolant circuit. In this case the coolant evaporates at least at one of the heat loads, and the condenser forms a heat sink. It is also possible for the third coolant stream to be thermally coupled to the evaporator of a refrigeration process for cooling in the heat sink. The heat sink can, for example, be the aircraft air conditioning system. The heat sink can also be formed by the outer skin of the aircraft.

The aircraft cooling system can be formed such that the third coolant stream cools the first and the second heat load in parallel after passing through the heat sink. Particularly efficient and safe redundant cooling of the first and the second heat load is as a result achieved. Should, for example, the first coolant stream fail, the first heat load is cooled by the third coolant stream and the second heat load by the second coolant stream. If, on the other hand, the second coolant stream fails, the first heat load is reliably cooled by the first coolant stream and the second heat load by the third coolant stream. This aircraft cooling system allows an aircraft to take off even though one of the coolant streams has failed.

The aircraft cooling system can be formed such that the third coolant stream is cooled with a cooling method different to that of the first coolant stream or the second coolant stream. It is also understood that each of the coolant streams can be cooled with a different cooling method. The fail safety of the aircraft cooling system is further increased by using a plurality of different cooling methods to produce the first, the second and/or the third coolant stream. The first and the second coolant stream can, for example, in each case be cooled by a heat exchanger which is disposed in a ram air channel. The third coolant stream can be cooled in a heat exchanger which is disposed in the bilge region of the aircraft. The bilge region of an aircraft is the lowermost region of an aircraft fuselage. This region is not insulated and is not air-conditioned. A heat sink can thus be provided in the bilge region using particularly simple means.

Even if both ram air channels should be clogged through soiling, for example, it is still possible to cool the first heat load and the second heat load through the third coolant stream, with the third coolant stream being cooled through a heat exchanger which is disposed in the bilge region of the aircraft.

The first heat load and the second heat load can be electronic devices. The electronic device which forms the first heat load can be mutually redundant with the electronic device which forms the second heat load.

The invention also relates to a method for cooling aircraft components which comprises the following steps: cooling a first heat load with a first coolant stream, cooling a second heat load with a second coolant stream and thermally coupling the first heat load to the second heat load. The first heat load and the second heat load can be formed by mutually redundant aircraft components. The first heat load and the second heat load can be thermally coupled through a third coolant stream. The third coolant stream can be cooled by a heat sink.

BRIEF DESCRIPTION OF THE DRAWINGS

The invention is now described in greater detail with reference to the single schematic FIGURE, which shows an aircraft cooling system according to the invention.

DETAILED DESCRIPTION

The aircraft cooling system according to the invention cools a first heat load 2a, which is formed by a first electronic device, and a second heat load 2b, which is formed by a second electronic device. A first coolant stream 4a cools the first heat load 2a, and a second coolant stream 4b cools the second heat load 2b. The first coolant stream 4a and the second coolant stream 4b are in each case a circuit in which the coolant is always in the liquid state.

An electronic device which is to be cooled can be disposed on a so-called cooling plate through which a coolant stream flows. The cooling plate therefore acts as a heat exchanger. A plurality of electronic devices can be accommodated in so-called electronics cabinets.

A first heat exchanger 6a is located in a first ram air channel 8a. A first pump 10a in causes the first coolant stream 4a to flow through the first heat exchanger 6a, where it is cooled, and subsequently to the first heat load 2a in order to cool the first heat load 2a. A second heat exchanger 6b is disposed in a second ram air channel 8b. The first heat exchanger 6a and the second heat exchanger 6b therefore act as a heat sink. A second pump 10b causes the second coolant stream 4b to flow through the second heat exchanger 6b in order to cool the second coolant stream 4b. The second coolant stream 4b subsequently flows to the second heat load 2b in order to cool the second heat load 2b.

The first electronic device, which produces the first heat load 2a, is mutually redundant with the second electronic device, which generates the second heat load 2b. If the first coolant stream 4a fails, because, for example, the first pump 10a is defective or the first ram air channel 8a is clogged, the first electronic device forming the first heat load 2a can no longer be properly operated. As the second electronic device forming the second heat load 2b is mutually redundant with the first electronic device, the aircraft can continue a flight which has already commenced. Should the first coolant stream 4a have failed prior to a take off, the aircraft cannot take off, as the first electronic device, which is mutually redundant with the second electronic device, cannot be properly operated. As electronic devices frequently execute safety-relevant functions, it is necessary to guarantee when taking off that, for each electronic device, an electronic device which is mutually redundant therewith is operable. The operability of an electronic device also includes the operability of its cooling system.

The invention proposes that the first heat load 2a be thermally coupled to the second heat load 2b. In the embodiment which is represented in FIG. 1 the first heat load 2a is coupled to the second heat load 2b by means of a third coolant stream 12. If the first coolant stream 4a or the second coolant stream 4b fails, the third coolant stream 12 ensures that both heat loads 2a and 2b are cooled through the coolant stream 4a or 4b which has not failed.

The third coolant stream 12 can be cooled by a third heat exchanger 16. The third coolant stream 12 can always be in the liquid state. The third heat exchanger 16 can be located in the bilge region of the aircraft, for example. The term bilge denotes the lowermost region of an aircraft fuselage, which is neither insulated nor air-conditioned. The third heat exchanger 16 can, for example, cool the third coolant stream 12 via the outer skin 18 of the aircraft. As a cooling method which is completely different to that for cooling the first coolant stream 4a and the second coolant stream 4b is used to cool the third coolant stream 12, a particularly safe redundant aircraft cooling system 1 is obtained. A third pump 14 pumps the third coolant stream through the third heat exchanger 16. The third coolant stream 12 then branches and cools the first heat load 2a and the second heat load 2b. The third heat exchanger 16 can also cool the third coolant stream 12 by means of cabin waste air.

If the first coolant stream 4a fails, the first heat load is cooled by the third coolant stream 12. The second heat load 2b is cooled both by the third coolant stream and by the second coolant stream 4. It is understood that the aircraft can continue a flight which has already commenced if the first coolant stream 4a fails, as the second coolant stream 4b and the third coolant stream 12 can continue to cool the first electronic device and the second electronic device. Since in this embodiment of the invention the heat load 2a which is produced by the first electronic device and the heat load 2b which is produced by the second electronic device are cooled by two mutually independent coolant streams even if one of the coolant streams fails, the aircraft can take off even in the event of such failure.

The present invention therefore increases the safety and the availability of an aircraft.

The invention claimed is:

1. An aircraft cooling system, comprising:
a first coolant stream which cools at least one first heat load, and
a second coolant stream which cools at least one second heat load,
wherein the first heat load and the second heat load are generated by two mutually redundant aircraft components, wherein the first heat load and the second heat load are bidirectionally thermally coupled to each other by a third coolant stream which thermally couples the first heat load and the second heat load together, wherein the aircraft cooling system is arranged such that the third coolant stream cools the first heat load and the second heat load in parallel after passing through a heat sink,
wherein the first heat load is connected to and cooled by flowing both the first coolant stream and the third coolant stream past the first heat load, and the second heat load is connected to and cooled by flowing the second coolant stream and the third coolant stream past the second heat load, and
wherein the first coolant stream is coupled to the first heat load and the third coolant stream is separately coupled to the first heat load such that the third coolant stream runs in parallel to and is coupled at a different location of the first heat load than the first coolant stream, and wherein the second coolant stream is coupled to the second heat load and the third coolant stream is separately coupled to the second heat load such that the third coolant stream runs in parallel to and is coupled at a different location of the second heat load than the second coolant stream.

2. The aircraft cooling system according to claim 1, wherein the aircraft cooling system is arranged such that the first coolant stream and the second coolant stream cool the first heat load and the second heat load in succession.

3. The aircraft cooling system according to claim 1, wherein the third coolant stream is arranged as a coolant circuit.

4. The aircraft cooling system according to claim 1, wherein the third coolant stream is cooled by the heat sink.

5. The aircraft cooling system according to claim 1, wherein the aircraft cooling system is arranged such that the third coolant stream is cooled with a cooling method different to that of the first coolant stream or the second coolant stream.

6. The aircraft cooling system according to claim 1, wherein the first coolant stream and the second coolant stream are each cooled by a heat exchanger which is disposed in a ram air channel, and the third coolant stream is cooled by the heat sink which is disposed in a bilge region of the aircraft.

7. The aircraft cooling system according to claim 6, wherein the heat sink cooling the third coolant stream includes an outer skin of the aircraft.

8. The aircraft cooling system according to claim 1, wherein the first heat load and the second heat load are electronic devices.

9. The aircraft cooling system according to claim 1, wherein the first coolant stream, the second coolant stream, and the third coolant stream are always in a liquid state.

10. A method for cooling at least two redundant aircraft components, comprising:
cooling a first heat load generated by a first aircraft component with a first coolant stream;
cooling a second heat load generated by a second aircraft component which is redundant to the first aircraft component with a second coolant stream;
bidirectionally thermally coupling the first heat load to the second heat load through a third coolant stream, wherein the third coolant stream cools the first heat load and the second heat load in parallel after passing through a heat sink,
wherein the first heat load is connected to and cooled by flowing both the first coolant stream and the third coolant stream past the first heat load, and the second heat load is connected to and cooled by flowing the second coolant stream and the third coolant stream past the second heat load, and
wherein the first coolant stream is coupled to the first heat load and the third coolant stream is separately coupled to the first heat load such that the third coolant stream runs in parallel to and is coupled at a different location of the first heat load than the first coolant stream, and wherein the second coolant stream is coupled to the second heat load and the third coolant stream is separately coupled to the second heat load such that the third coolant stream runs in parallel to and is coupled at a different location of the second heat load than the second coolant stream.

11. The method for cooling aircraft components according to claim 10, further comprising:
cooling the third coolant stream with the heat sink.

12. The method for cooling aircraft components according to claim 10, wherein the heat sink cooling the third coolant stream includes an outer skin of the aircraft.

* * * * *